Oct. 12, 1965      W. H. HARWOOD ETAL      3,210,996
ADJUSTABLE TEMPERATURE CALORIMETER
Filed Feb. 14, 1963      3 Sheets-Sheet 1

INVENTORS
WILLIAM H. HARWOOD &
TIBOR O. EDMOND
BY

ATTORNEY

INVENTORS
WILLIAM H. HARWOOD &
TIBOR O. EDMOND

ATTORNEY

United States Patent Office 3,210,996
Patented Oct. 12, 1965

3,210,996
ADJUSTABLE TEMPERATURE CALORIMETER
William H. Harwood and Tibor O. Edmond, Ponca City, Okla., assignors to Continental Oil Company, Ponca City, Okla., a corporation of Delaware
Filed Feb. 14, 1963, Ser. No. 258,416
2 Claims. (Cl. 73—190)

This invention relates to improvements in calorimeters, and more particularly, but not by way of limitation, to a constant-temperature environment calorimeter.

The present construction of calorimeters precludes rapid changes in operating temperatures and the application of an efficient low heat-leak insulating system surrounding the samples for specific heat determinations. It is often necessary, however, to acquire specific heat data as the function of temperature, necessitating measurements at a number of temperatures.

In the use of calorimeters, it is desirable to attain a high degree of accuracy for small sample determinations. This desired accuracy is impossible to attain when errors from heat leakage are introduced and there is an irregular heat transfer through the body of the sample being tested. There are other factors which militate against the desired accuracy, such as the calorimetric device having too large a heat capacity and not being adequately temperature-sensitive for minute variations.

It is also desirable in the construction of a calorimeter which attains the accuracy sufficient to satisfy practical industrial requirements, to avoid overcomplicating the device or the procedure to the point where routine determinations would be hampered. It is then evident that what is needed is a basic and relatively simple device which is versatile and which performs thermodynamic measurements with a high degree of accuracy.

The present invention contemplates a novel non-isothermal calorimeter wherein a first Dewar flask receives a fluid sample upon which a thermodynamic test is to be performed. This Dewar flask acts as a primary heat barrier to minimize heat exchange between the sample and the environment. The first Dewar flask is enclosed by a second Dewar flask and spaced therefrom to define a cavity therebetween. This cavity may be filled with a suitable insulating material to preclude a transmission of heat to the inner Dewar flask by radiation. The outer Dewar flask acts as a secondary heat barrier to lag out temperature fluctuations of short durations in the air bath enclosing the calorimeter. The calorimeter is provided with a three-stage lid assembly which respectively closes the inner and outer Dewar flasks and which provides a means for suspending the calorimeter within a constant temperature air bath. The sample is stirred by a stirring assembly which extends through the lid assembly. A heat input element extends into the sample for selectively applying heat to the sample. The inner flask is also provided with a suitable temperature detector.

The cavity between the inner and outer Dewar flasks is also provided with a suitable temperature detector and with a suitable heater which may be energized to raise the temperature in the cavity in a short period of time and to thereby effect an equilibrium of the insulating system when it is desired to conduct a thermodynamic test on the sample at a higher temperature than had been previously used.

The calorimeter in operation is suspended in a constant temperature air bath having inner and outer shells. The outer shell is spaced from the inner shell to define a chamber therebetween which receives a suitable insulating material. The inner and outer shells are provided, in their upper portions, with communicating apertures through which the calorimeter extends. A primary heat source is disposed within the inner shell to provide for a continuous heat input which maintains the temperature of the chamber within the inner shell at a constant temperature and which compensates for the dissipated heat at an operating temperature. The inner shell is also provided with a secondary heat source which facilitates the rapid elevation of the temperature of the chamber within the inner shell whenever necessary for a thermodynamic test. The random circulation of the air within the inner shell chamber is provided by a plurality of suitable circulating fans.

Accordingly, an object of this invention is to provide an adjustable, constant-temperature environment calorimeter which effectively isolates a sample undergoing a heat test.

It is another object of this invention to provide a doubleheat barrier calorimeter.

It is still another object of this invention to provide a calorimeter which permits the operating temperature thereof to be changed rapidly with a decreased equilibration time.

And yet another object of this invention is to provide a calorimeter having an efficient, low heat-leak insulating system which keeps heat leakage to a minimum.

A further object of the present invention is to provide a calorimeter which is temperature-sensitive for minute variations in the temperature of the tested sample.

A still further object of this invention is to provide a novel calorimeter which may be used to attain a high degree of accuracy for small sample specific heat determinations.

Another object of this invention is to provide a calorimeter which is relatively simple, easy to construct, and which has a long service life with a minimum of maintenance.

Other objects and advantages of this invention will be evident from the following detailed descriptions, when read in conjunction with the accompanying drawings, which illustrate our invention.

Figure 1:
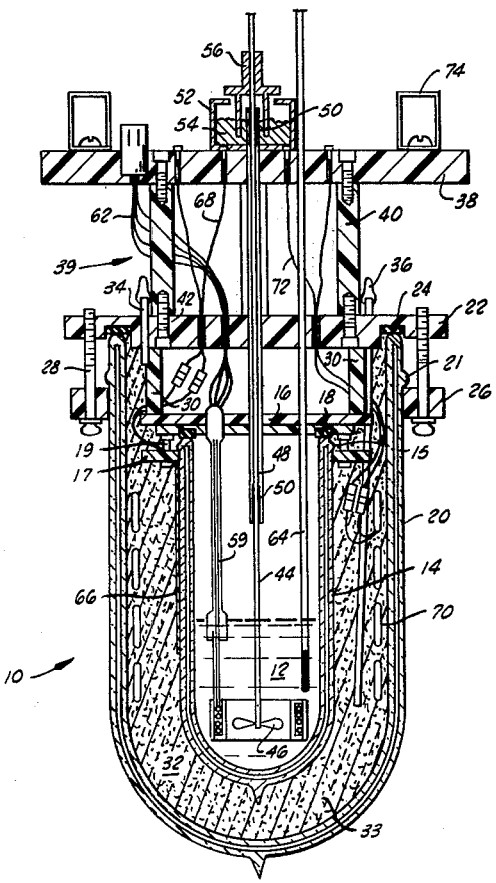
FIG. 1 is a vertical sectional view of one embodiment of a calorimeter constructed in accordance with this invention.

Referring to the drawings, and particularly FIG. 1, reference character 10 generally designates a non-isothermal calorimeter, illustrating one embodiment of the present invention which is particularly adapted to perform thermodynamic tests up to 120° C. on aqueous solutions. An insulating container for a fluid sample 12 is provided by a suitable Dewar flask 14 having a circumferential shoulder 15. As it is well known to one skilled in the art, a Dewar flask is a double-walled silvered glass container having the space between the walls evacuated so as to preclude the transmission of heat therethrough. The flask 14 is closed by a suitable insulating lid or cover 16 which is provided with a suitable gasket 18 to provide an efficient fluid seal between the lid 16 and the flask 14. An annular member 17 is removably disposed on the flask 14 to abut the shoulder 15. The lid 16 is urged against the upper portion of the flask 14 by a plurality of bolts 19 securing the lid to the member 17.

The inner Dewar flask 14 is partially enclosed by an outer insulating container in the form of another Dewar flask 20. The flask 20 is closed by a suitable insulating lid or cover 22 which is provided with an annular gasket 24 that provides an efficient fluid seal between the flask 20 and the lid 22. The flask 20 is provided with an annular circumferential shoulder 21 at the upper end portion thereof. An annular member 26 is slidably disposed around the outer periphery of the flask 20 and abuts the shoulder 21. A plurality of screws 28 extend through the member 26 to threadably engage the lid 22 so that a progressive tightening of the screws 28 will effectively seal the lid 22 against the upper portion of the flask 20. The lid 22 is spaced from the lid 16 and is secured thereto by a plurality of upright members 30.

The inner Dewar flask 14 is spaced from the outer flask 20 to define an annular cavity 32 therebetween. Although the cavity 32 may be filled with air, in the particular embodiment shown in FIG. 1, the cavity 32 is preferably filled with a suitable insulating material 33 such as fiberglass, although not limited thereto, to preclude the transmission of heat therethrough by radiation. A plurality of glass tubes 34 closed by suitable caps 36 extend through the lid 22 into the cavity 32 for a purpose which will be hereinafter set forth. A third insulating lid or cover 38 is spaced from the secondary lid 22 by a plurality of vertically upstanding members 40. The lids 38 and 22 are secured to the upstanding members 40 in a suitable manner such as by a plurality of screws 42 as seen in FIG. 1. In normal utilization of this invention the lids 38, 22 and 16 are connected, as previously set forth, in what may be considered a unitary lid assembly 39. The lids 38, 22 and 16 are preferably constructed of a suitable insulating material such as a laminated plastic to preclude a transmission of heat therethrough.

A stirring assembly is provided for stirring or agitating the fluid sample 12 received within the flask 14. In the arrangement illustrated, this assembly comprises a shaft 44 having a propeller 46 secured to its lower end and being rotatably positioned within a glass tube housing 48, extending through the lids 38, 22 and 16. The shaft 44 is connected at its upper end to a suitable driving means (not shown) for rotating the propeller 46 within the sample 12. The propeller 46 is rotated at a desired revolutions per minute to effect a desired stirring and agitation of the fluid sample 12. The shaft 44 is journaled in two graphite-filled plastic bushings 50 located at each end of the housing 48. The bushings 50 provide a more uniform friction for the rotating shaft 44 and preclude the entrance of vapor between the shaft 44 and the housing 48. The upper end of the stirring assembly is also provided with a suitable mercury seal assembly having an upwardly extending cup 52, receiving a suitable volume of mercury 54. An inverted cup 56 is secured to the shaft 44 in a suitable manner and has its lowermost edge portion extending below the surface of the mercury 54 to further preclude the entrance of vapor into the inner flask 14 through the housing 48.

Figure 1A:
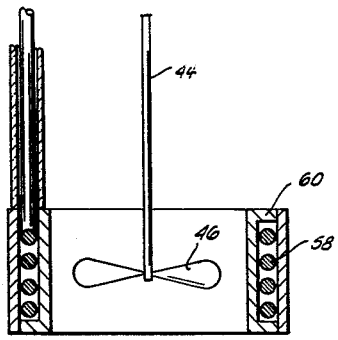
FIG. 1A is a fragmentary detail view of a heater shown in FIG. 1.

A heat input element for the sample 12 is provided by an electrical resistance heater 58 which is capsulated within a suitable separable brass ring 60, as shown in FIG. 1A. The heater 58 is connected to a plurality of suitable conductors 62 partially enclosed in a glass tube 59, which extend through the lids 38, 22 and 16 for connection to a suitable power source 180 (see FIG. 4).

A means to detect the temperature of the sample 12 is provided by a suitable thermometer or thermistor 64. Since it is necessary to determine the temperature of the sample with a high degree of accuracy, it is necessary that a highly accurate thermometer or thermistor be used. An example of a commercially obtainable thermometer which has been successfully used with the present invention is the Leeds & Northrup Thermal Platinum Resistance Thermometer No. 8163–B.

The temperature of the cavity 32 is determined by a suitable temperature detecting means such as a thermocouple 66 which is connected to the upper surface of the lid 38 through a plurality of conductors or leads 68 which extend through the lids 38 and 22. A suitable electrical resistance heater 70 is positioned in the cavity 32 for selectively raising the temperature thereof. The heater 70 is connected to the upper surface of the lid 38 through suitable conductors or leads 72 which extend through the lids 38 and 22. The lid 38 is further provided with a plurality of grip 74 which are secured to the lid 38 in a suitable manner to enable an operator to easily handle the calorimeter 10. The appropriate electrical connections to the electrical components of the calorimeter 10 may be made after it has been positioned in an air bath since the lid 38 is provided with the necessary leads for the components.

Thus, it is apparent that the present invention provides a novel calorimeter which effectively isolates a fluid sample for a thermodynamic test and which substantially precludes heat leakage deleterious to the test. A primary heat barrier is provided by an inner Dewar flask 14 which receives the sample and which minimizes heat exchange between the sample and the environment. A secondary heat barrier is provided by an outer Dewar flask 20 which lags out bath temperature fluctuations of short duration. An insulating material may be disposed in the cavity between the primary and secondary heat barriers to preclude the transmission of heat by radiation.

Figure 2:
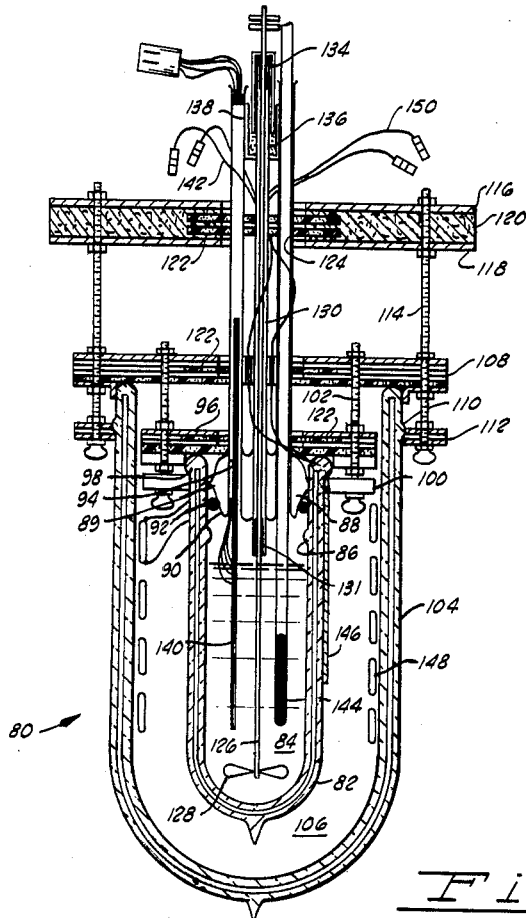
FIG. 2 is a vertical sectional view of another embodiment of this invention.

Another embodiment of the present invention is illustrated in FIG. 2 wherein reference character 80 generally indicates a calorimeter. A first insulating container in the form of an inner Dewar flask 82 receives a non-conducting liquid sample 84 for performing thermodynamic measurements from room temperature to 200° C. The inner periphery of the flask 82 is provided with an inwardly extending annular shoulder 86 which limits the downward travel of an evacuated silvered glass plug 88 which is slidably disposed within the Dewar flask 82. The lower portion 90 of the glass plug 88 is tapered and receives a suitable O-ring 92 which is compressed between the plug 88 and the flask 82 in a wedging action to provide a seal therebetween. The glass plug 88 is also provided with an outer circumferential annular shoulder 89 which limits the longitudinal travel of the O-ring 92 up the tapered portion of the plug 88. The glass plug 88 is further provided with a plurality of longitudinally extending passages 94 for a purpose which will be hereinafter set forth.

The inner flask 82 is further closed by a first insulating lid 96 which is preferably of a multiple element sandwich construction. A construction which has been used with success, although not limited thereto, comprises layers of sponge rubber, high density synthetic resin materials and aluminum with a resilient layer being positioned to come into contact with the upper portion of the flask 82 for a sealing thereof. With such a sandwich construction, any excessive local strain is avoided and sufficient flexibility is obtained to permit alignment, yet adequate force can be applied to secure a good seal between the inner flask 82, the glass plug 88 and the primary lid 96.

The upper end of the inner flask 82 is provided with a circumferential shoulder 98. An annular member 100 is slidably disposed on the flask 82 in an abutting relationship with the shoulder 98 and receives a plurality of bolts 102 which secure the first lid 96 to the annular member 100 in a suitable manner so that the first lid 96 is urged against the upper portion of the flask 82 in a sealing contact. The inner flask 82 is partially enclosed by an outer insulating container in the form of a Dewar flask 104. The outer Dewar flask 104 is spaced from the inner flask 82 to define a cavity 106 therebetween. The flask 104 is closed by a second insulating lid or cover 108. It is also preferred that the secondary lid have a sandwich type construction utilizing aluminum, asbestos, sponge rubber, and high density synthetic resin materials. The outer Dewar flask is provided at its upper portion with a circumferential shoulder 110. An annular member 112 is slidably disposed around the outer flask 104 and abuts against the shoulder 110. The annular member 112 receives a plurality of suitable bolts 114 which secures the second lid 108 in sealing contact with the upper portion of the flask 104. The secondary lid 108 is preferably constructed so that a resilient layer contacts the upper portion of the flask 104 to act as both a gasket and a strain equalizer. The inner flask 82 is supported within the outer flask 104 by the bolts 102 which are connected to the first lid 96 and are also connected to the second lid 108.

A third insulating lid or cover 116 is spaced from the second lid 108 and connected thereto by the bolts 114. The third lid is preferably constructed, although not limited thereto, of a sandwich structure wherein outer layers of aluminum 118 are positioned on each side of an inner layer of asbestos 120. The insulated lids 116, 108 and 96 are provided at their central portions with a plurality of sponge rubber layers 122. The sponge rubber layers 122 are provided with a plurality of suitable apertures 124 to allow the necessary implements to extend therethrough into the sample 84 contained in the inner flask 82 and to provide a resilient seal therearound which will preclude injury to the implements. It will be understood that in normal use of the calorimeter 10 the lids 116, 108 and 96 are normally secured together in a unitary separable lid assembly.

A shaft or rod 126, having a suitable propeller 128 secured to the lower end thereof, extends through a suitable sleeve 130 into the sample 84. The sleeve 130 extends through the apertures 124 in the sponge rubber layers 122 and an aperture 94 in the glass plug 88. The sleeve 130 is provided at the upper and lower portions with suitable bushings 131 for the journaling therein of the rod 126. The rod 126 may be rotated by a suitable driving means (not shown). A cup 134 is secured to the upper portion of the sleeve 130 above the third lid 116. Since the embodiment of the calorimeter shown in FIG. 2 is utilized for thermodynamic tests under temperatures higher than those utilized with the embodiment of the calorimeter shown in FIG. 1, it is desirable to use a suitable silicone fluid 136 in the cup 134 in place of mercury. An inverted cup 138 is secured to the stirring rod 126 and its inverted edge extends beneath the surface of the silicone fluid 136 to effect a fluid seal for the upper portion of the sleeve 130 which is positioned within the inverted cup 138.

A heat input element that takes the form of an electrical resistance heater 140 extends through the lids 116, 108 and 96 and the glass plug 88 into the sample 84. Since the fluid sample 84 is not electrically conductive, there is no necessity to capsulate the portion of the heater covered by the sample. The heater 140 is provided with a plurality of suitable conductors 142 for connection to a suitable power source (not shown).

A means to detect the temperature of the sample 84 is shown in the embodiment disclosed in FIG. 2 as being a platinum resistance thermometer 144 which extends into the fluid sample 84 through the lids 116, 108 and 96 and the glass plug 88 through the appropriate apertures 94 provided therein. A thermometer is preferably used in applications where the sample is to be heated to a high temperature since a thermistor is normally unable to withstand elevated temperatures.

A means of detecting the temperature of the cavity 106 is provided by a suitable thermocouple 146. A suitable electrical resistance heater 148 having appropriate leads 150 is disposed in the cavity 106 for a selective heating thereof.

Thus, a calorimeter 80 illustrates how the calorimeter 10 may be easily adapted for use in a different type of fluid sample in a different temperature range. Both calorimeters use an inner Dewar flask as a primary heat barrier to minimize the exchange between the sample and the environment, and a second Dewar flask spaced upwardly from the first flask to lag out bath temperature fluctuations of short duration. The cavity defined between the two flasks may be selectively heated to bring the insulating system into equilibrium when it is desired to operate the calorimeter at a higher temperature than was previously utilized in a previous thermodynamic test. It is preferable in both illustrated embodiments of the invention to provide for said cavity to be filled with air or some other insulating material, such as fiberglass, which has heat insulating properties.

Figure 3:
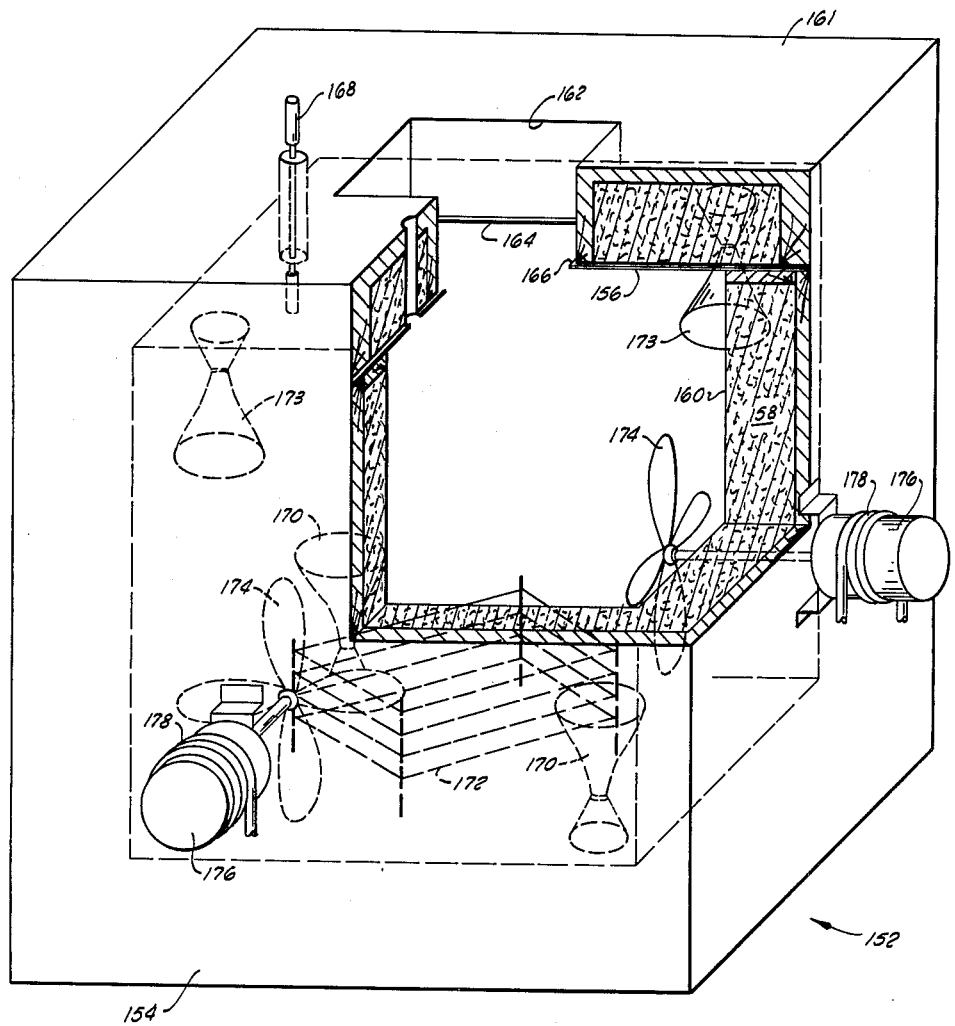
FIG. 3 is a perspective view, partly in section, of a calorimeter suspended in a constant temperature air bath, both of which are constructed in accordance with this invention.

A constant temperature air bath 152 for either of the calorimeters 10 or 80 is provided by the construction shown in FIG. 3. The air bath 152 has an outer shell 154 which is preferably composed of plywood. An inner shell 156 preferably composed of sheet steel, is spaced inwardly from the outer shell 154 to provide a cavity 158 therebetween. A suitable insulating material 160, such as fiberglass, is disposed in the cavity 158. The inner and outer shells of the air bath 152 are preferably constructed to provide a removable lid 161 so as to afford access to the inner shell 156.

The air bath 152 is provided with a means for receiving a calorimeter 10. The outer shell 154 is provided with a suitable aperture 162 which communicates with an aperture 164 of the inner shell 156. The diameter of the aperture 164 is less than of the aperture 162 so as to provide an inwardly extending shoulder 166 which receives the third lid 38 of the calorimeter 10 so that the calorimeter 10 may be suspended within the air bath 152.

A suitable temperature detecting device 168 extends through the lid 161 into the interior of the inner shell 156 to determine the temperature therein. A constant heat input for the air bath 152 is provided by a primary heat source in the nature of a plurality of infrared or heat lamps 170 and an electrical resistance heater 172 which are positioned within the inner shell 156. The lamps 170 and heater 172 supply the necessary heat to maintain the interior of the shell 156 at a constant desired temperature during a thermodynamic test conducted with the calorimeter 10. A secondary heat source in the form of a plurality of infrared lamps 173 positioned in the upper portion of the shell 156 or lid 161 provides a rapid temperature rise within the shell when it is desired to change the operating temperature of the air bath 152. A plurality of conventional air fans 174 are mounted perpendicularly to each other in the bath 152 in an assymetrical position to achieve maximum randomness of air circulation within the shell 156. The fan motors 176 may be cooled in a suitable manner such as by air or by water circulated through a suitable coil 178 as shown in FIG. 3.

Figure 4:
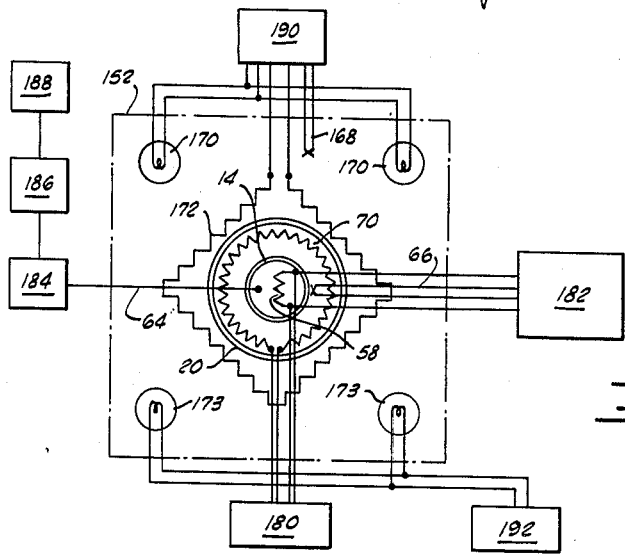
FIG. 4 is a simplified schematic wiring diagram of the embodiment of this invention shown in FIG. 1.

A simplified wiring diagram of the calorimeter 10 in the constant temperature heat bath 152 is shown in FIG. 4 with some of the structural elements being schematically indicated to indicate the general physical relationship. As previously seen in FIGS. 1 and 1A, the resistance heater 58 is disposed within the inner Dewar flask 14. The heater 58 is energized by a suitable power source 180. Since the measurement of the energy input during the heating cycle of the thermodynamic test is accomplished entirely by the measurement of potential drops across the heaters, potential differences are the only kind of signals to be measured. Accordingly, a suitable potentiometer 182 is connected across the heater 158. An example of a suitable potentiometer is the Leeds & Northrup Type K–2 Double Range Precision Potentiometer. The temperature-detecting means disposed within the inner flask 14 is either a thermistor or a platinum resistance thermometer 64 which is connected to a Mueller bridge 184 which measures the resistance of the temperature-sensing element being used. A Mueller bridge that is commercially obtainable and which has been used with success in the present invention is the Leeds & Northrup Type G–2 Mueller Bridge. The output of the Mueller bridge 184, being in the order of microvolts, is amplified by a suitable amplifier 186. The output signal from the amplifier is then continuously recorded by a suitable recorder 188 as a function of time. A recorder which has been used with success is a Leeds & Northrup Speedomax G Single Point Curve-Drawing Indicating Recorder No. 69800.

The heater 70 which is disposed in the cavity 32 is connected to the power source 180. A temperature-detecting element or thermocouple 66, also disposed in the cavity 32, is connected to the potentiometer 182.

The heat lamps 170 are connected to a temperature control unit 190 which monitors the temperatures detected by the temperature-detecting means 168 and which corrects temperature differences by a selective energization of the electric resistance heater 172 and the lamps 170. A suitable temperature control unit is an Electron-O-Therm Sr., Model 148, manufactured by the Technical Equipment Company, Walnut Creek, California. The heat lamps 173 which facilitate rapid elevation of the temperature of the air bath when necessary are connected to a powerstat 192 which is independent from the temperature control unit 190.

*Operation*

Prior to the performance of thermodynamic tests on a sample, it may be assumed that the equipment has been previously calibrated and has been warmed up. Also, for a discussion of the operation of this invention, it may be assumed that the highest intended temperature will not exceed a 120° C. or that the sample is electrolytically conductive so that the embodiment of the invention illustrated in FIG. 1 calorimeter 10 will be used.

Using conventional laboratory techniques, a predetermined volume of a liquid sample is disposed in the inner flask 14. The cover 16 is then secured to the flask 14 in the manner described. The heater 58, the stirring means 46 and the temperature detecting means 64 have been previously extended through the lid 16 and secured therein so that they now extend into the sample 12 to a desired depth. The lid 16 is normally secured to the second lid 22 and the third lid 38 in a unitary assembly so that when the lid 16 is secured to the flask 14, the flask is then secured to all three lids. The flask 14 is then disposed within the outer flask 20 and the secondary lid 22 secured to the outer flask 20 by means of the bolts 28 and the annular member 26 as previously described. If it is so desired, an inert gas may be introduced through the glass tubes 34 for blanketing the inner flask. This gas blanketing is a safety measure to preclude ignition of a combustible sample.

The calorimeter 10 is then placed with the constant temperature air bath 152 by an operator who grasps the grips 72 and positions the calorimeter in the bath through the apertures 162 and 164 so that the third lid 38 rests upon the inwardly extending shoulder 164. The necessary electrical connections of the calorimeter 10 to its attendant equipment as shown in the simplified line diagram of FIG. 4 is then made. The constant temperature air bath 152 is then brought to the desired operating temperature by means of the heat lamps 170 and the heater 172.

Once the temperatures of the air bath, the cavity 32, and the sample 12 are in the desired range, the thermodynamic test can be initiated. A predetermined quantity of heat is then applied to the sample by means of the sample heater 58 as determined by the potentiometer 182.

A change in the temperature of the sample 12 is detected by the temperature-detecting means 64 which is connected to the Mueller bridge 184. The resultant signal from the Mueller bridge 184 is amplified by the amplifier 186 and recorded by the recorder 188 as a function of time. After a predetermined heating time has elapsed, the sample heater 58 is de-energized to cease the heating of the sample. The sample temperature, however, is recorded for some time after the heating has ceased in order to obtain information necessary for the required computations. It is evident that the above procedure can then be repeated, if so desired, to obtain a group of repeat determinations at progressively higher temperatures for more thermodynamic tests. The heater 70 disposed in the cavity 32 enables an operator of the calorimeter 10 to quickly raise the temperature of the cavity to a desired level, thereby reducing the time required to bring the insulating system into equilibrium. It is then possible to compute the specific heat, for example of the sample 12, from the record made by the recorder 188 and the information obtained from the calibration of the calorimeter 10 by computations familiar to one skilled in the art.

From the foregoing, it is apparent that the present invention provides a double heat calorimeter which effectively isolates a sample undergoing a heat test. The first heat barrier is provided by a vacuum container that receives the sample and which minimizes heat exchange between the sample and the environment. A secondary heat barrier is provided by a spaced vacuum container which lags out bath temperature fluctuations of short duration. The double heat barrier calorimeter provides an efficient low heat leak insulating system which keeps heat leakage to a minimum and which enables the calorimeter to have a high degree of accuracy for small sample determinations. A heater is provided in the space between the double heat barriers so that the thermal equilibrium of the insulating system can be obtained in a short period of time, thereby allowing a plurality of heat tests to be run in a relatively short period of time. Being able to run these tests in a short period of time precludes changes in the sample due to temperature applied over a period of time and saves a considerable expense by economizing the time of the skilled operators of the calorimeter. Finally, it will be apparent that the present invention provides a novel calorimeter which is simple in construction, may be economically manufactured and which has a long service life.

Changes may be made in the combination and arrangement of parts or elements as heretofore set forth in the specification and shown in the drawing, it being understood that changes may be made in the precise embodiment disclosed without departing from the spirit and scope of the invention as defined in the following claims.

We claim:

1. A calorimetric heat measuring device for performing a heat test on a fluid sample, comprising:

an outer shell having an aperture in the upper portion thereof;

an inner shell having an aperture in the upper portion thereof communicating with the aperture in said outer shell and being spaced inwardly from the outer shell to define a chamber therebetween;

a material which precludes the transmission of heat therethrough positioned in said chamber;

means to determine the temperature within the inner shell;

a secondary heater positioned within the inner shell;

means to circulate the air within the inner shell;

a container receiving the sample, said container precluding the transmission of heat therethrough;

a second container precluding the transmission of heat therethrough, said second container enclosing the first container and spaced therefrom to define a cavity therebetween;

the inner shell receiving the containers through said aperture and supporting said containers therewithin;

means for stirring the sample;

means for determining the temperature of the sample;

means for elevating the temperature of the sample;

means for determining the temperature of said cavity; and means to elevate the temperature of said cavity.

2. A calorimetric heat measuring device for performing a heat test on a fluid sample, comprising:
- an outer shell having an aperture in the upper portion thereof;
- an inner shell having an aperture in the upper portion thereof communicating with the aperture in said outer shell and being spaced inwardly from the outer shell to define a chamber therebetween;
- an insulating material disposed in said chamber;
- means to determine the temperature within the inner shell;
- a primary heater positioned within the inner shell;
- a secondary heater positioned within the inner shell;
- means to circulate the air within the inner shell;
- a vacuum flask receiving the sample;
- a second vacuum flask enclosing the first flask and spaced therefrom to define a cavity therebetween;
- the inner shell supporting the flasks therewithin from its upper portion;
- means for stirring the sample;
- means for determining the temperature of the sample;
- means for elevating the temperature of the sample;
- means for determining the temperature of said cavity; and
- means to elevate the temperature of said cavity.

References Cited by the Examiner

UNITED STATES PATENTS

| | | | |
|---|---|---|---|
| 1,136,359 | 4/15 | Parr | 73—191 |
| 2,733,602 | 2/56 | Jackson et al. | 73—190 |
| 2,982,123 | 5/61 | Kindred | 73—23 |

RICHARD C. QUEISSER, *Primary Examiner.*